United States Patent [19]

Lindquist

[11] 4,306,738
[45] * Dec. 22, 1981

[54] FLANGED FITTINGS FOR FLOORS OR ROOFS

[76] Inventor: William W. Lindquist, 190 Clarencedale Ave., Youngstown, Ohio 44512

[*] Notice: The portion of the term of this patent subsequent to Jan. 6, 1998, has been disclaimed.

[21] Appl. No.: 118,755

[22] Filed: Feb. 4, 1980

Related U.S. Application Data

[63] Continuation-in-part of Ser. No. 80,077, Sep. 28, 1979, Pat. No. 4,243,251.

[51] Int. Cl.³ .................................................. F16L 5/00
[52] U.S. Cl. ........................................... 285/4; 285/42; 285/56; 285/161
[58] Field of Search ................. 285/42, 56, 58, 161, 285/4, 3, 43, 44; 52/98

[56] References Cited

U.S. PATENT DOCUMENTS

| | | | |
|---|---|---|---|
| Re. 13,485 | 11/1912 | Carlson | 285/4 |
| 842,363 | 1/1907 | Watrous | 285/58 |
| 1,185,846 | 6/1916 | Simpson | 285/4 X |
| 1,352,248 | 9/1920 | Coar | 285/4 |
| 1,833,187 | 11/1931 | Stringer | 285/42 X |
| 1,849,604 | 3/1932 | Weatherhead, Jr. | 285/161 X |
| 2,961,914 | 11/1960 | Young | 285/159 X |
| 3,339,215 | 9/1967 | Flood | 285/58 X |
| 3,420,552 | 1/1969 | Mork | 285/42 |
| 3,481,632 | 12/1969 | Suess | 285/42 |

FOREIGN PATENT DOCUMENTS

| | | | |
|---|---|---|---|
| 251074 | 9/1962 | Australia | 285/58 |
| 493320 | 4/1919 | France | 285/4 |

*Primary Examiner*—Thomas F. Callaghan
*Attorney, Agent, or Firm*—Webster B. Harpman

[57] ABSTRACT

A flanged fitting comprises a flanged tubular member for positioning in an opening in a floor or roof to form a tubular conduit therethrough. The flange on the fitting may comprise a closet flange, a floor drain flange, or a flat roof flange. Additionally, the flange may be provided with an upstanding tubular member to which a secondary tubular conductor may be attached in the nature of a vent. A sleeve is engaged about the tubular member such as by a clamping member thereon with the upper portion of the sleeve being of a considerably larger diameter and provided with a plurality of circumferentially spaced finger-like sections which are frangible. The flanged fitting may thus be clampingly secured in an opening in a floor or a roof in a desirable location in an opening therein to serve an intended purpose.

5 Claims, 3 Drawing Figures

FLANGED FITTINGS FOR FLOORS OR ROOFS

This application is a continuation-in-part of my co-pending patent application Ser. No. 080,077 filed Sept. 28, 1979, now U.S. Pat. No. 4,243,251.

BACKGROUND OF THE INVENTION (1) Field of the Invention

This invention relates to floor or roof drain fittings by means of which liquids may be conducted through openings in the floor or roof and directed into a conductor in communication therewith.

(2) Description of the Prior Art

A typical floor drain structure is shown in U.S. Pat. No. 3,481,632 and a water sealed trap is seen in U.S. Pat. No. 1,185,846. Similiar flanged constructions are seen in U.S. Pat. No. Re. 13,485 and 1,352,248.

No prior art is known wherein a flanged tubular member is of integral construction and is provided with either a closet flange, a floor flange or a roof flange and alternately provided with a vertical extension of the tubular member so that a vent pipe or the like may be attached thereto to extend thereabove. No prior art is known wherein an adjustable sleeve is secured to the tubular member and provided with frangible portions which are engaged against the bottom of a roof or a floor so as to hold the flanged fitting in desired position in the opening in the roof or floor as necessary when providing for the installation of a finished floor or the like.

SUMMARY OF THE INVENTION

A floor or roof flanged fitting consists of a flanged tubular member with means on the tubular member for adjustably mounting a sleeve for movement longitudinally thereof, the upper end of the sleeve being enlarged and provided with frangible portions so that it may be engaged against the underside of the roof or floor through which the fitting is positioned to clampingly secure the fitting in desired relation in the opening.

DESCRIPTION OF THE PREFERRED EMBODIMENT

Figure 1:
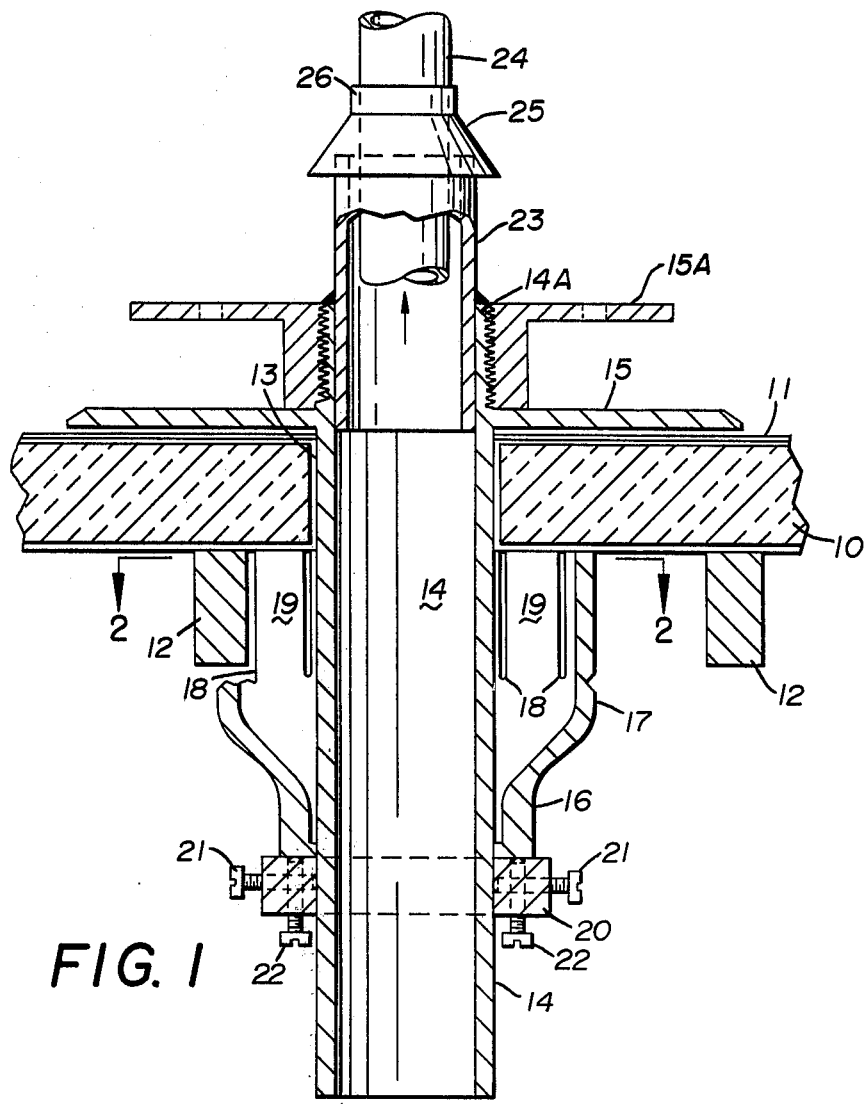
FIG. 1 is a cross sectional side elevation of the flanged fitting for floor or roof installations.

By referring to the drawings and FIG. 1 in particular, it will be seen that a section of a roof or a floor structure 10 is disclosed on which one or more layers of surface material 11 are positioned. Supporting members 12 are shown beneath the roof or floor structure 10 and may or may not be integrally formed therewith as will occur to those skilled in the art.

An opening 13 is formed in the roof or floor structure 10 and a tubular member 14 having a flat outwardly extending annular flange 15 thereon inwardly of its upper end is shown positioned in the opening 13 and extending downwardly and upwardly vertically therethrough and two points above and below the support members 12. A sleeve 16, the lower end of which is of a diameter slightly larger than the outer diameter of the tubular member 14 has an upper portion of substantially larger diameter as indicated at 17 and is provided with a plurality of circumferentially spaced vertically arranged slots 18 so that in effect the uppermost portion 17 of the sleeve 16 is formed of a plurality of spaced vertically standing fingers 19.

In order that the sleeve 16 and its fingers 19 may be moved upwardly against the lower surface of the roof or floor structure 10 so as to position the outwardly extending annular flange 15 of the device in desired relation relative to the roof or floor structure 10, a clamping ring 20 is slidably engaged on the exterior surface 21 of the tubular member 14. A plurality of circumferentially spaced bolts 21 are threadably engaged in threaded openings in the clamping ring 20 so that when they are turned inwardly of the clamping ring 20, they will forcibly engage the exterior surface 21 of the tubular member 14 and hold the clamping ring 20 in desired position thereon.

As illustrated in FIG. 1 of the drawings, one or more of the finger-like portions 19 has been broken away so that the upper end of the sleeve 17 can be positioned with its upper annular edge in engagement with the lower surface of the roof or floor portion 10 despite the presence of one of the support members 12, which would otherwise interfere with such positioning. The clamping ring 20 has been moved upwardly along the tubular member 14 to properly position the sleeve 16 and the bolts 21 turned inwardly to secure the same. Final adjustment of the position of the sleeve 16 relative to the floor or roof structure 10 may be made by rotating a plurality of secondary bolts 22 which are positioned in circumferentially spaced relation in vertically arranged threaded bores in the clamping ring 20 as will be understood by those skilled in the art.

Still referring to FIG. 1 of the drawings, it will be seen that the uppermost portion of the tubular member 14 and indicated in FIG. 1 by the numeral 14A extends vertically above the upper surface of the flat outwardly extending flange 15 of the device and may therefore receive and retain a secondary tubular member 23.

As illustrated, the secondary tubular member 23 is shown cemented into position in the portion 14A of the tubular member 14, but it will occur to those skilled in the art that it may alternately be threadably engaged therein by matching thread patterns formed on the respective parts. A third tubular member 24 of smaller diameter than the tubular member 23 is positioned partially within the upper end of the tubular member 23 and is in turn provided with an outwardly and downwardly extending angularly disposed annular flange 25 which is secured to the third tubular member 24 by a ring and gasket 26. An adjustable vent pipe construction is thus easily arranged through the use of the device of the invention.

Those skilled in the art will observe that the flat outwardly extending annular flange 15 may be altered in minor detail so that it forms a closet flange on which a water closet may be mounted as will occur to those skilled in the art and that when the device of the invention is employed for such a purpose, the positioning of the flat outwardly extending closet flange may be spaced above the surface of the floor 10 so as to accommodate the installation of a finished floor such as ceramic tile or the like as will occur to those skilled in the art. Such an altered flange is indicated by numeral 15A in FIG. 1 of the drawings.

Alternately, the exterior surface of the uppermost portion 14A of the tubular member 14 may be provided with a thread pattern and a closet flange fitting having an internal thread pattern may be engaged thereon and a still further variation of the utility of the flanged fitting disclosed herein may be realized by substituting a floor drain fitting having an internal thread pattern engaged on an external thread pattern on the upper extending portion 14A of the flanged fitting disclosed herein and again in spaced relation to a sub-floor so that a finished floor may be positioned therebeneath and around and about the upward extension 14A, all as will occur to those skilled in the art.

It will thus be seen that a simple, relatively inexpensive flanged fitting for a floor or a roof installation in openings therein has been disclosed which comprises relatively few inexpensive parts which may be inexpensively molded of appropriate synthetic resin material and that by reason of the arrangement and configuration, the fitting may be installed in almost any location in a floor or a roof structure and its clamping means readily adapted to provide clearance for supporting members, pipes, conduits, or other articles and its configuration providing for external vertical extensions easily and economically. By cutting away or breaking away the finger-like projection 19 on one side of the upper end of the sleeve 16, the device may be adapted to fit against an angularly disposed roof structure while the principal tubular member 14 remains on a substantially vertical axis.

Figure 2:
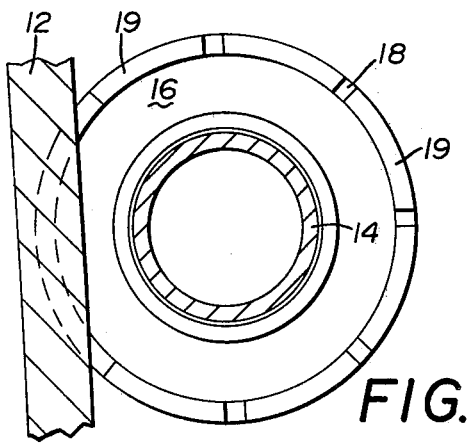
FIG. 2 is a horizontal section on line 2—2 of FIG. 1.

In FIG. 2 of the drawings, a horizontal section on line 2—2 of FIG. 1 may be seen and it will be observed that the area normally occupied by the upper portion of the sleeve 16 has been broken away to provide clearance for the support member 12.

Figure 3:
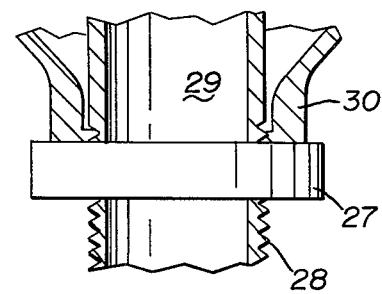
FIG. 3 is a vertical section of a modification of the means by which the sleeve portion of the device seen in FIG. 1 may be adjustably secured to the tubular portion thereof.

In FIG. 3 of the drawings, a modification of the clamping ring 20 of FIG. 1 of the drawings may be seen.

In FIG. 3 a modified clamping ring 27 is shown and is provided with an internal thread pattern engagable with an external thread pattern 28 on the external surface of a principal tubular member 29, which compares with the tubular member 14 hereinbefore described.

The rotation of the modified clamping ring 27 will adjustably position the sleeve 30 which in the modification of FIG. 3 is the same as the sleeve 16 heretofore described.

Although but one embodiment of the present invention has been illustrated and described, it will be apparent to those skilled in the art that various changes and modifications may be made therein without departing from the spirit of the invention, and

Having thus described my invention what I claim is:

1. A flanged fitting for installation in openings in floors and roofs comprises a vertically disposed tubular member having an outwardly extending flange inwardly of the upper end thereof, a sleeve slidably disposed on said tubular member below said flange and means on said tubular member below said sleeve for urging said sleeve toward said flange in a clamping-like action, a second tubular member disposed in said first mentioned tubular member above said flange, said secondary tubular member forming a vertical extension, said sleeve having an uppermost area of enlarged diameter incorporating a plurality of circumferentially spaced slots arranged in parallel relation to said tubular member, the portions of said uppermost area of the sleeve between said slots being adapted to be broken away so as to change the configuration of said sleeve.

2. The flanged fitting set forth in claim 1 and wherein a continuous thread pattern is formed on said first mentioned tubular member above said flange and a closet flange is engaged on said tubular member, said closet flange having a depending portion, a continuous thread pattern on said depending portion arranged for registry with said thread pattern on said first mentioned tubular member.

3. The flanged fitting set forth in claim 1 and wherein the means on the fitting below the sleeve for urging the sleeve toward the flange in a clamping-like action comprises a clamping ring having a plurality of circumferentially spaced threaded bores disposed horizontally therein, threaded fasteners engaged in said bores for frictional engagement with said tubular member.

4. The flanged fitting set forth in claim 1 and wherein the means on the fitting below the sleeve for urging the sleeve toward the flange in a clamping-like action comprises a clamping ring having a plurality of circumferentially spaced threaded bores disposed horizontally therein, threaded fasteners engaged in said bores for frictional engagement with said tubular member, and a plurality of circumferentially spaced vertical bores in said clamping ring and a plurality of secondary fasteners disposed in said vertical bores and movable relative to said clamping ring to exert upward pressure on said sleeve.

5. The flanged fitting set forth in claim 1 and wherein said means on said fitting below the sleeve for urging the sleeve toward the flange in a clamping-like action comprises the formation of a continuous thread pattern on the exterior of said tubular member and a clamping ring having a continuous thread pattern on its inner surface registrable with the thread pattern on the tubular member, said clamping ring adapted to be rotated to move longitudinally of the tubular member and exert tension on said sleeve.

* * * * *